April 15, 1930. A. L. MENZIN 1,754,477
SEPARATOR
Filed June 29, 1925 3 Sheets-Sheet 2

INVENTOR:
Abraham L. Menzin
BY  E. J. Andrews
ATTORNEY.

April 15, 1930.  A. L. MENZIN  1,754,477
SEPARATOR
Filed June 29, 1925  3 Sheets-Sheet 3
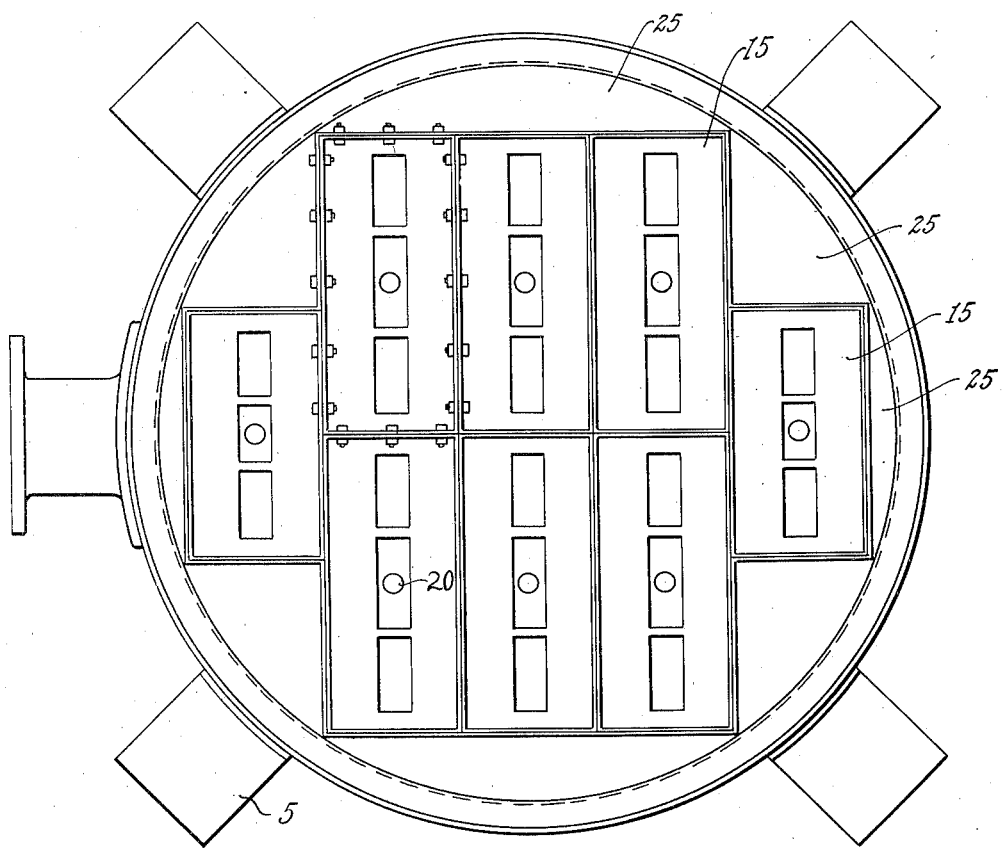
Fig. 3
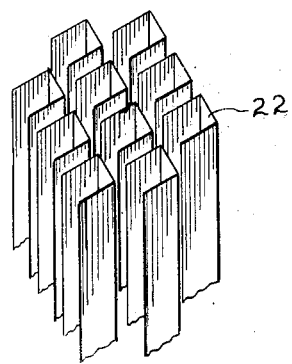
Fig. 4
INVENTOR:
Abraham L. Menzin
ATTORNEY.

Patented Apr. 15, 1930

1,754,477

UNITED STATES PATENT OFFICE

ABRAHAM L. MENZIN, OF SAN FRANCISCO, CALIFORNIA, ASSIGNOR, BY DIRECT AND MESNE ASSIGNMENTS, TO BLAW-KNOX COMPANY, OF BLAWNOX, PENNSYLVANIA, A CORPORATION OF NEW JERSEY

SEPARATOR

Application filed June 29, 1925. Serial No. 40,193.

This invention relates to gas purifiers such as are adapted to separate moisture or impurities from gases or vapors of various sorts, and it is particularly adaptable to uses where a large capacity is desired. One of the objects of the invention is to provide purifying means which can be conveniently installed in large units. Another object is to arrange and distribute the apparatus so that the most efficient results are arrived at. Another object is to provide purifying means which is self contained and substantially independent of the other gas apparatus such as the steam boiler, which is generating the gas which is to be purified. Other objects of the invention will be apparent from a consideration of the accompanying drawings and the following description thereof.

Figure 1:
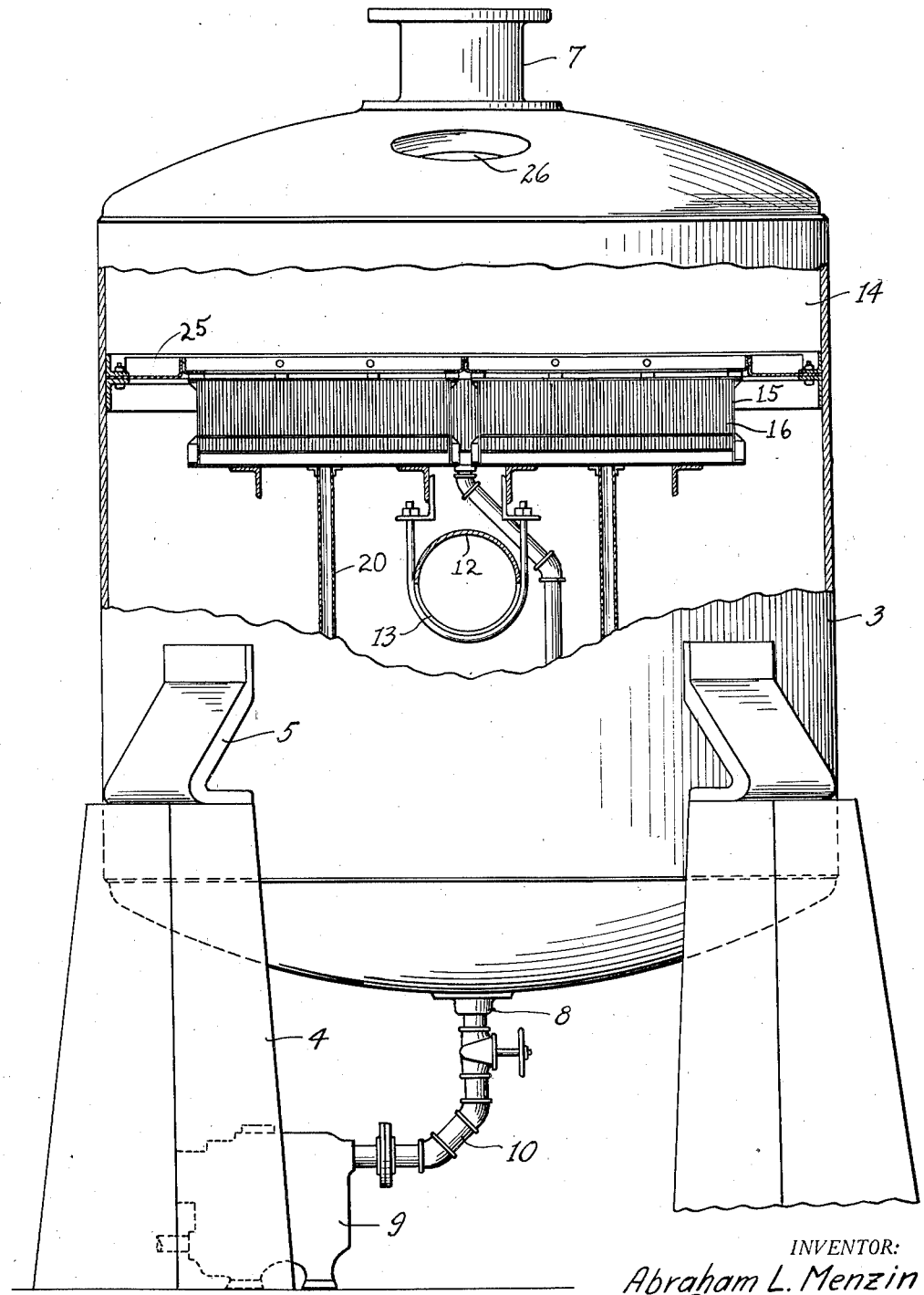
Figure 2:
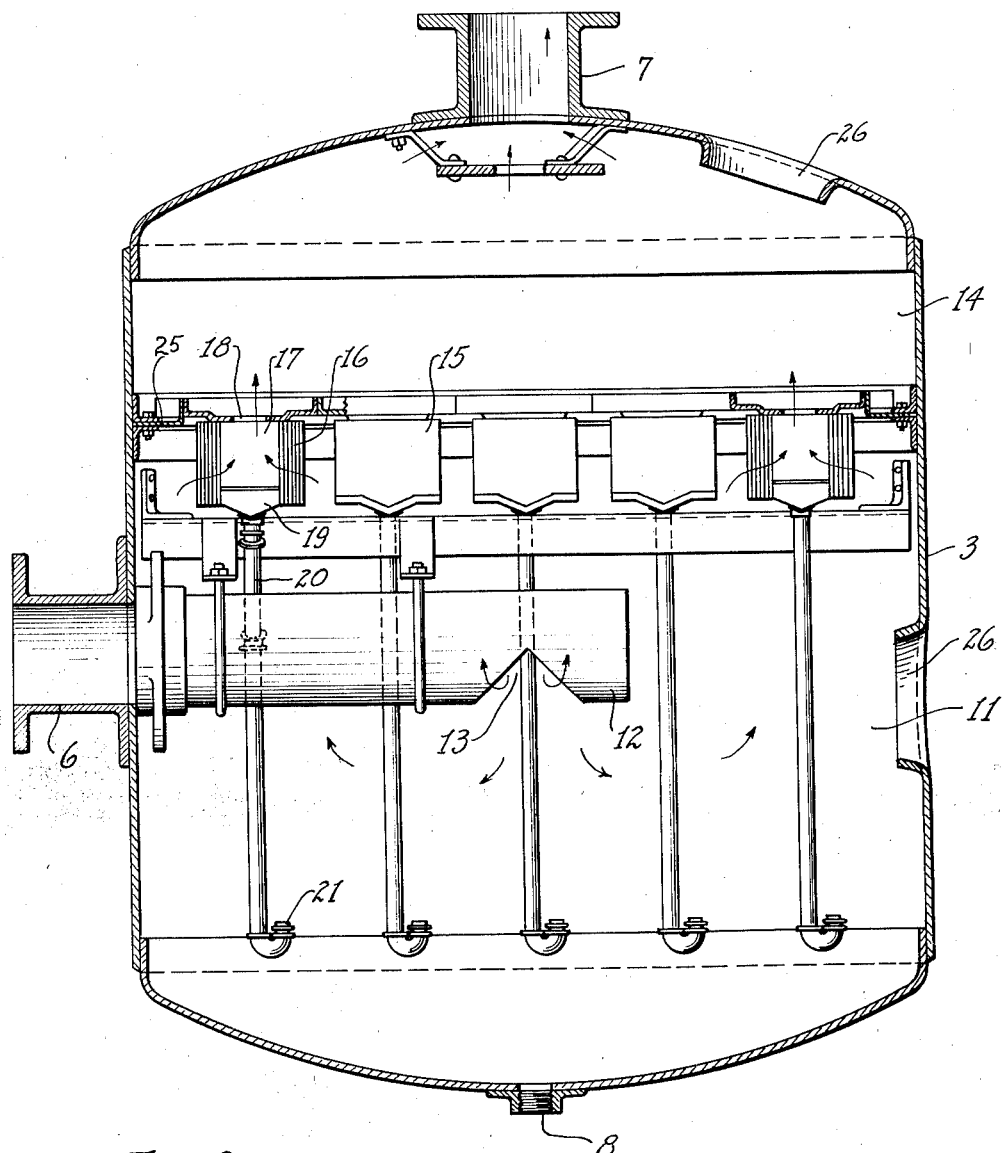

Of the drawings Fig. 1 is an elevation of a purifier with a portion broken away to show the interior mechanism; Fig. 2 is a similar elevation of the purifier rotated through an angle of 90°, and with the entire casing in section; Fig. 3 is a plan view of the purifier with the top of the casing removed; and Fig. 4 is a perspective view of some purifying baffles which may be used.

The purifier system comprises a casing 3 supported on pedestals 4, by means of brackets 5. The casing has a gas inlet 6 to receive the gas which is to be purified, and a gas outlet 7 through which the purified gas passes. In the lower portion of the casing is an outlet 8 through which liquids and other impurities pass through a pipe 10 into a steam trap 9 or other devices adapted to receive and care for the liquids. The casing has a lower chamber 11 into which the gas passes from the inlet 6. The gas passes into the chamber 11 preferably through a pipe 12 extending into the central part of the chamber. The pipe has an opening 13 in the lower part thereof through which the gas passes into the chamber, the gas being thus delivered substantially in the central portion of the chamber, and is distributed over the cross section of the casing. The upper portion of the casing is a chamber 14 into which the purified gas passes on its way from the purifying elements.

The purifying elements comprise a plurality of casings 15 in each of which is mounted cartons of baffles 16 which are adapted to purify, in any suitable manner, the gas as it passes through. The gas then passes into a central chamber 17 in the purifier casing and thence into the chamber 14 through outlets 18 in the upper part of the purifying elements.

These purifying elements may be of any suitable or ordinary form. I prefer for the purpose those having trough-shaped baffles 22 (Fig. 4) through which the gas passes and against which solids and liquids impinge and pass downwardly into a chamber 19. From this chamber the liquids pass through drain pipes 20 and check valves 21 into the lower chamber 11. In this manner the gas as it passes through the baffles is purified and passes out through the outlets 18 free from solids or liquids.

In order to force all of the gas to pass through the purifying elements, plates 25 are mounted in the casing so as to entirely close the openings between the various purifying elements 15. In this manner a partition or diaphragm is formed, including the purifying elements, which entirely separates the lower chamber from the upper chamber of the casing and thus forces all of the gas through the purifying elements. Manholes 26 are provided in the casing so as to obtain access to the two chambers.

As is well understood, in order to obtain the best result with purifiers, and especially to operate them at the maximum capacity it is necessary to pass the gas through all portions of the baffles at substantially the same speed. And to accomplish this it has been found necessary to have the gas pressure substantially uniform at all portions of the baffles and to have the back pressure in the purifying elements substantially uniform throughout. It is somewhat difficult to produce this result where a large number of cartons of baffles are used as there is a tendency for pressure on one side of the baffles to be greater at one portion of the baffles than at others. But with my apparatus this tendency is substantially overcome. By passing the gas into the central portion of the lower chamber 11 the pressure is continuously distributed throughout the entire chamber and is substantially the same at all points on the diaphragm and hence at all points of the baffle inlets. And correspondingly with the back pressure on the other side of the baffles. The size of the chamber 14 insures fairly uniform pressure throughout and hence fairly uniform back pressure at the outlets of the purifying elements, and these outlets being large and extending substantially the full length of the purifying elements a substantially uniform pressure is insured in the chambers 17 and hence at all points on the rear side of the baffles. The arrangement also provides for substantially uniform excess pressure on all of the outlet valves 21.

With this arrangement also it is possible to install a practically unlimited number of purifying elements without undue inconvenience and without disturbing the uniformity of gas pressure on both sides of the elements. Also the inconvenience of installing the purifiers in the boilers, or other gas generating or separating apparatus, is entirely eliminated, giving greater capacity to the gas apparatus, and avoiding the annoyance of such installations.

It will be understood that the nature and details of the individual purifying elements are not an essential part of my invention, and that modifications in the structure shown and described could be made by those skilled in the art without departing from the spirit of my invention as disclosed by the following claims.

I claim as my invention:

1. A gas purifier comprising a hollow casing, a gas inlet and a gas outlet mounted in the walls of said casing, and a horizontal diaphragm mounted in said casing between said inlet and outlet and forming a partition between the upper and lower portions of the casing, said diaphragm having openings therein and a vertical purifying element mounted beneath each of said openings, said elements being materially elongated and having gas inlets and gas outlets extending substantially the full length thereof through which gas can pass from the lower side of said diaphragm to the upper side thereof.

2. A steam purifier comprising a hollow casing, a gas inlet and a gas outlet mounted in the walls of said casing, and a horizontal diaphragm mounted in said casing between said inlet and outlet and forming a partition between the upper and lower portions of the casing, said diaphragm having openings therein and vertical purifying elements mounted beneath said openings, said elements being materially elongated vertically and having gas inlets and gas outlets extending substantially the full length thereof through which gas can pass from the lower side of said diaphragm to the upper side thereof, and gas purifying baffles mounted in the inlets of said purifying elements.

3. A steam purifier comprising a hollow casing, a gas inlet and a gas outlet mounted in the walls of said casing, and a horizontal diaphragm mounted in said casing between said inlet and outlet and forming a partition between the upper and lower portions of the casing, said diaphragm having openings therein and purifying elements mounted in said openings, said elements being materially elongated and having gas inlets and gas outlets extending substantially the full length thereof through which gas can pass from the lower side of said diaphragm to the upper side thereof, gas purifying baffles mounted in the inlets of said purifying elements, said baffles being trough-shaped and vertically mounted.

4. A steam purifier system comprising a casing having a steam inlet and a steam outlet, a horizontal diaphragm mounted in said casing between said inlet and outlet, said diaphragm having a plurality of openings therethrough, and steam purifiers mounted in said casing, each purifier having a steam passageway with an outlet registering with one of said openings, the aggregate capacity of all the steam passageways through said purifiers being many times as great as the capacity of said steam outlet.

5. A steam purifier system comprising a hollow casing, a steam inlet and a steam outlet mounted in the walls of said casing, and a horizontal diaphragm mounted in said casing between said inlet and outlet and forming a partition between the upper and lower portions of the casing, said diaphragm having openings therethrough, and a steam purifier fixed to said diaphragm adjacent each of the said openings and with its steam outlet registering with the opening, and a liquid drain connected with each of said purifiers, the aggregate capacity of said openings being many times as great as the capacity of the casing outlet.

6. A steam purifier comprising a hollow casing, a gas inlet and a gas outlet mounted in the walls of said casing, and a horizontal diaphragm mounted in said casing between said inlet and outlet and forming a partition between the upper and lower portions of the casing, said diaphragm having openings therein and purifying elements mounted beneath said openings, and drain pipes connected with the lower portion of said elements.

7. A steam purifier comprising a casing having a steam inlet and a steam outlet, a horizontal diaphragm mounted in said casing between said inlet and outlet, said diaphragm having a plurality of openings therethrough, a steam purifying element operatively associated with each opening, and plates mounted between said elements and the walls of the casing, a liquid outlet in the lower end of said casing, and a pipe arranged to conduct steam from said inlet to the space beneath the central portion of said diaphragm, the aggregate capacity of all the steam passageways through said purifying elements being many times as great as the capacity of said steam outlet.

In testimony whereof, I hereunto set my hand.

ABRAHAM L. MENZIN.